Feb. 13, 1962 K. C. SALO 3,021,107
SELF LEVELING TRACTOR AND IMPLEMENT SEAT
Filed Dec. 18, 1958 2 Sheets-Sheet 1

Kenneth C. Salo
INVENTOR.

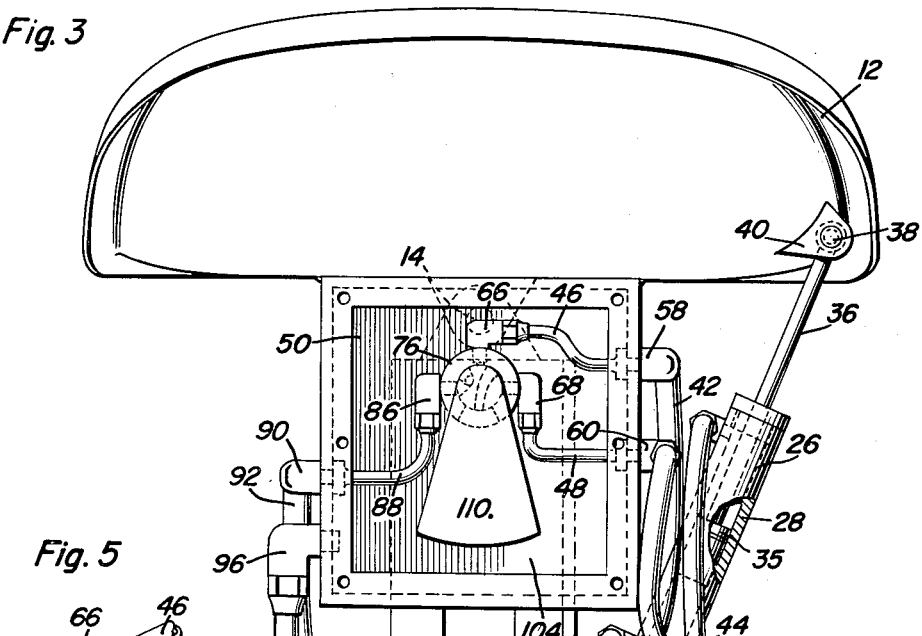

United States Patent Office 3,021,107
Patented Feb. 13, 1962

3,021,107
SELF LEVELING TRACTOR AND IMPLEMENT SEAT
Kenneth C. Salo, Aura, County of Baraga, Mich.
Filed Dec. 18, 1958, Ser. No. 781,271
10 Claims. (Cl. 248—376)

This invention relates to implement and/or tractor seats and more particularly to a self leveling seat.

An object of the present invention is to provide a seat which remains in a horizontal position regardless of the tilt of the supporting structure to which the seat is attached. The supporting structure may be a part of a tractor, an implement or any other vehicular type device which ordinarily is subject to tilting during normal operation thereof.

A further object of the invention is to provide a self leveling seat which is mounted on a pivot, the seat being furnished with a cylinder, for example a hydraulic cylinder with one end of the cylinder attached to the seat and the other end attached to a comparatively stationary supporting structure, there being a source of hydraulic fluid under pressure applied to either end of the hydraulic cylinder automatically in response to the tilting of the structure to which the seat is operatively connected. This is preferably achieved by a multi-position valve having a plurality of ports and a valve core to control the ports. The valve core has means connected with it that are so arranged as to maintain a vertical orientation so that the valve body is turned with respect to the core thereby opening and closing the correct ports to apply liquid under pressure to the correct end of the hydraulic cylinder. This causes the seat to tilt so that it retains its horizontal orientation.

When the seat is tilted the entire valve is tilted with the seat inasmuch as the valve is carried in a casing that is carried within the seat or a mechanical part which is movable with the seat. One of the important features of the invention is the casing in which the valve is located. One of the ports of the valve opens into the casing so that some of the hydraulic liquid is in the casing at all times. This liquid acts as a damping fluid for the leveling means attached to the valve core so that they will not oscillate or be jarred back and forth in response to small, abrupt jerks and motions of the tractor, implement or other vehicle. Accordingly, the valve mechanism is designed to correct displacement from a level position without responding to inertia and accelerating forces resulting from unidirectional tractor accelerating movement and vibrations in response to which relative valve movements are not desired. Hence, the mechanism responds substantially only to the force of gravity for correction purposes, to the exclusion of inertia and accelerating forces.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is a rear view of the seat and tilting structure, parts of the tilting structure being removed to expose the pendulum weight.

FIGURE 5 is an enlarged sectional view showing the valve in a second position that is, when the tractor or implement is tilted in one direction.

FIGURE 6 is a sectional view showing the valve as it would appear when the tractor or other implement is tilted in the opposite direction.

FIGURE 7 is a rear view of the self leveling seat on a tractor.

Figure 1:
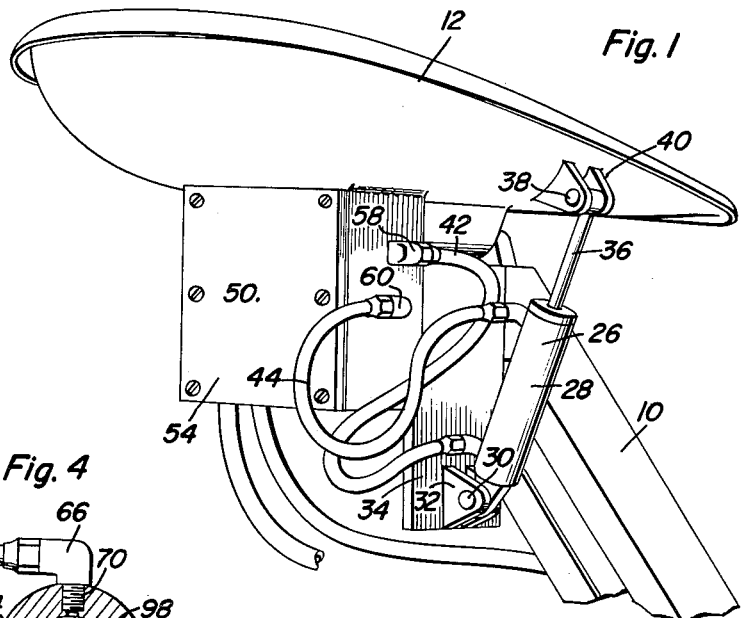
FIGURE 1 is a perspective view of a seat and means by which the seat is maintained in a horizontal position.

In the accompanying drawings there is a support structure 10 which diagrammatically represents a part of an implement, tractor or any other vehicle or device on which there is ordinarily a seat occupant. Seat 12 is attached to the support or supporting structure by means of a pivot 14 which is passed through a pair of aligned openings 16 and 18 in parallel mounting brackets 20 and 22 that are attached to the supporting structure. The pivot pin 14 also passes through a passage 24 in a bearing block 26 which is welded or otherwise fastened to the bottom of the seat. This mounts the seat 12 so that it is capable of oscillation about the longitudinal axis of the pin 14, the latter being constructed of an ordinary bolt or some other type of pin.

The means responsive to the tilting of the supporting structure 10 for immediately restoring the seat 12 or maintaining the seat 12 in a horizontal position, include a double acting cylinder 26, this being either pneumatically or hydraulically operative, preferably the latter. The double acting cylinder has a cylindrical body 28 attached by pivot pin 30 and mounting ears 32 to a part of the supporting structure, for example a depending bracket 34. The double acting cylinder has a piston 35 and a piston rod 36 that extends through one end of the cylinder and that is attached to by pivot pin 38 to a pair of mounting ears 40 welded or otherwise secured to seat 12 in a position laterally spaced from the longitudinal axis of pin 14. Inasmuch as the cylinder 26 is a double acting cylinder, there are two lines 42 and 44 attached to the ports of the cylinder near or at each end thereof and attached to lines 46 and 48 that constitute continuations of the lines 42 and 44.

There is a casing 50 rigidly secured to the bottom of the seat 10 and made of a plurality of walls, one of which has an opening 52 therein. A cover plate 54 is bolted or otherwise secured over the opening 52, and there is a gasket 56 between the cover plate 54 and the wall of the casing 50 to which the cover plate 54 is bolted. Lines 42 and 44 are attached to fittings 58 and 60 that are secured to one side wall of casing 50, and lines 46 and 48 are secured to the same fittings, having portions which pass through openings in a wall of casing 50. Fittings 66 and 68 connect the inner ends of lines 46 and 48 to the ports 70 and 72 in the valve body 74. The valve body of valve 76 is welded or otherwise secured to a wall of the casing 50 so that the body of the valve moves with the seat 12. Ports 70 and 72 are inlet and outlet ports, each of these ports functioning as an inlet and as an outlet depending on the setting of the valve core 80 which is mounted for rotation in the bore 82 of the valve body. Pressure outlet port 84 in valve body 74 has a fitting 86 connected with it, there being a line 88 attached to fitting 86. This line is also connected to a fitting 90 in a side wall of casing 50, and there is a pressure return line 92 attached to fitting 90. Accordingly, port 84 is a pressure return port. The supply line 94 is attached by fitting 96 to the lower part of casing 50 and functions to conduct liquid to casing 50 from the hydraulic source system (not shown) which may be the ordinary hydraulic power system with which many implements and tractors are equipped. Port 102 in valve body 74 receives liquid under pressure from the chamber 104 formed by casing 50.

Figure 4:
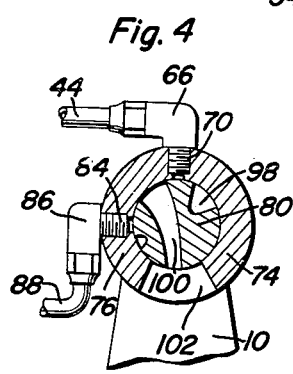
FIGURE 4 is a sectional view taken approximately on the line 4—4 of FIGURE 2 and in enlarged scale, showing the valve setting as it would appear when the pendulum is in the vertical position.
Figure 2:
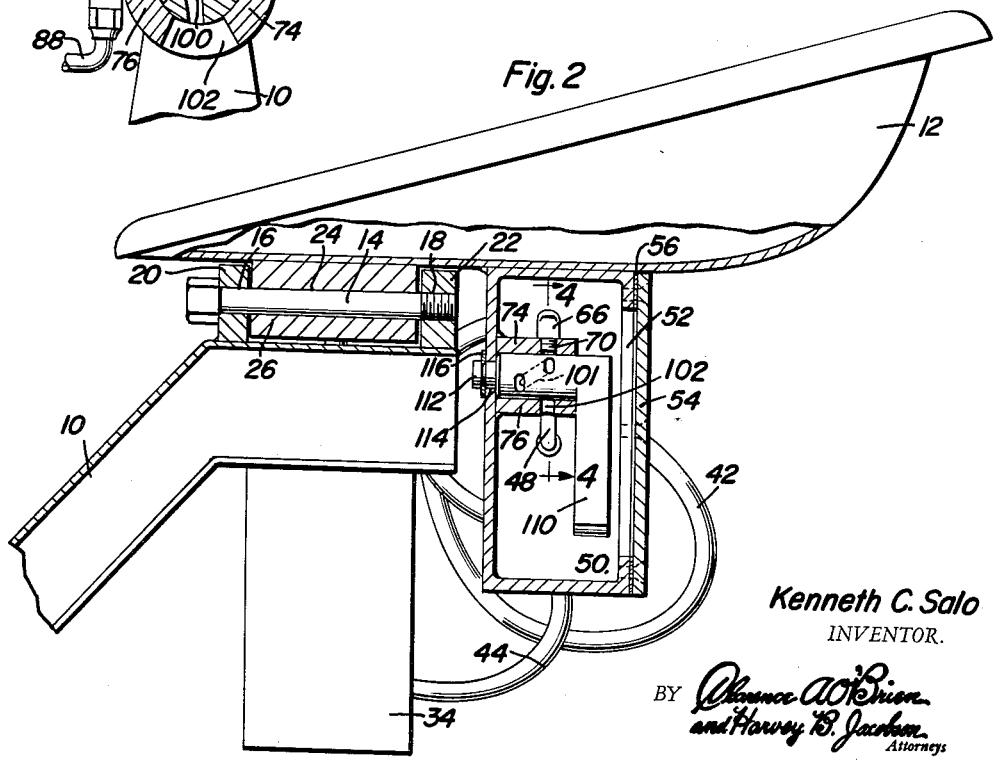
FIGURE 2 is an elevational view, parts being broken away in section, of the seat and tilting structure.

The valve core 80 has passages 98 and 100 and as seen from a comparison of FIGURES 4-6 the valve functions as follows: Pressure is always applied through port 102. When the valve tilts to the left (FIGURE 5) passage 100 registers with fitting 68 to apply liquid under pressure to lines 48 and 44 and conduct the liquid to the top of the cylinder 26. This moves the seat, by retraction of the piston rod into the cylinder, so that it immediately responds to remain in a horizontal position. At the same valve setting port 84 registers with port 70 so that liquid from the opposite end of the hydraulic cylinder may return through port 70 and port 84 and line 88 to the hydraulic source return reservoir. When the valve is moved to the right (FIGURE 6), as measured from a vertical reference line, passage 100 registers with port 70 and port 102 to conduct liquid under pressure to the opposite end of the hydraulic cylinder. At the same time pressure is relieved from the top of the cylinder through passage 98 and its branch passage 101 through ports 72 and 84. This moves the seat promptly to have the seat essentially remain horizontal.

The valve core is maintained in a fixed position by a leveling weight 110 which is attached to one end of the valve core. The valve body is rotatable with respect to the leveling weight 110, and this is how the valve settings are changed. It will be appreciated by those skilled in the art that weight 110 being mechanically unrestrained as far as relative pivotal movement is concerned, will respond only to pivotal displacement of the seat to control the valve core position for tilt correction purposes without any oscillations being imparted thereto by virtue of pivotal displacement of the seat. Also, by virtue of the damping action of the fluid in chamber 104, the weight 110 will be isolated from the effects of inertia forces to which the weight 110 may otherwise be subjected and which would tend to oscillate the weight. Accordingly, the valve core 80 will respond only to unidirectional tilting movements of the seat and provide positive tilt correction control. In order to maintain the valve core and valve body assembled properly, an inner end of the valve core has a spindle 112 passed through an opening 114 in the rear wall of casing 50, and there is a retainer washer 116 in a groove in the spindle 112 preventing the valve core from separating from the valve body.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the invention as claimed.

What is claimed as new is as follows:

1. A self leveling seat for a seat supporting structure comprising a pivot to which the seat is secured, a cylinder connected to said seat and said structure, and means responsive to non-vibratory tilting of said structure and to the exclusion of inertia and unidirectional accelerating forces for actuating said cylinder in a direction to pivotally move said seat in a direction to restore the seat to a predetermined position, said cylinder actuating means including a multi-position valve having a valve core, means for connecting said valve to a source of fluid under pressure, pressure lines connecting said valve with opposite ends of said cylinder.

2. A self leveling seat for a seat supporting structure comprising a pivot to which the seat is secured, a cylinder connected to said seat and said structure, and means responsive to non-vibratory tilting of said structure and to the exclusion of inertia and unidirectional accelerating forces for actuating said cylinder in a direction to pivotally move said seat in a direction to restore the seat to a predetermined position, said cylinder actuating means including a multi-position valve having a valve core, means for connecting said valve to a source of fluid under pressure, pressure lines connecting said valve with opposite ends of said cylinder, and a leveling weight attached to said valve core.

3. A self leveling seat for a seat supporting structure comprising a pivot to which the seat is secured, a cylinder connected to said seat and said structure, means responsive to non-vibratory tilting of said structure for actuating said cylinder in a direction to pivotally move said seat in a direction to restore the seat to a predetermined position, said cylinder actuating means including a multi-position valve having a valve core, means for connecting said valve to a source of fluid under pressure, pressure lines connecting said valve with opposite ends of said cylinder, and a leveling weight attached to said valve core, said valve connecting means having a casing, said valve mounted in said casing and having an inlet port which opens into said casing so that at least some fluid is received into said inlet port from said casing, and the casing and fluid therein constituting a damper for said leveling weight so as to eliminate movement thereof in response to inertia and unidirectional accelerating forces.

4. In combination, a seat, means mounting said seat for pivotal movement, a hydraulic pressure source control valve, means securing a part of said control valve to said seat so that the valve part is movable with the seat as the seat is pivotally displaced, said valve part being the valve body which is fixed with reference to the seat, said valve having a valve core which is movable with respect to said valve body, means connected to said core to maintain said core in a fixed non-vibrating, spatial position so that as the seat is tilted said body is moved with reference to the core, a double acting hydraulic cylinder, said valve body having two ports, pressure and return lines extending from said two ports to opposite ends of said double acting cylinder whereby said cylinder is operated to be extended and retracted selectively to be in response to tilting of the seat.

5. The combination of claim 4 wherein there is a casing in which the valve is disposed, means securing the casing for movement with the seat, said valve having an inlet part which opens into said casing, means to supply fluid under pressure into said casing for acceptance into said valve inlet port, and some of the fluid constituting a damper for said core maintaining means.

6. In combination, a seat, means mounting said seat for pivotal movement, a hydraulic pressure source control valve, means mounting said control valve on said seat so that the valve is movable with the seat as the seat is pivotally displaced, said valve having a valve body which is fixed with reference to the seat and a valve core which is movable with respect to said valve body, means connected to said core to maintain said core in a particular non-vibrating, setting so that as the seat is tilted said body is moved with reference to the core, a double acting hydraulic cylinder, said valve body having ports, pressure lines extending from said two of said ports to opposite ends of said double acting cylinder whereby said cylinder is operated to be extended and retracted selectively to be in response to tilting of the seat whereby the seat may be maintained in a selected plane, said means attached to said valve core including a leveling weight, said means securing said valve body to the tractor seat including a casing, one of the ports of said valve body opening into said casing, said leveling weight disposed in said casing, said casing adapted to contain some liquid from said port which opens into said casing whereby the liquid functions as a damper for the leveling weight.

7. In a tractor seat which is mounted for a pivotal movement on a seat supporting structure, the improvement comprising means connected with the seat for pivotally moving said seat in response to unidirectional tilting movement of the seat to maintain the seat in a level position, said means including a cylinder connected with said seat and said structure, and means for admitting fluid under pressure to said cylinder to actuate said cylinder and thereby pivotally actuate said seat, said means for applying fluid under pressure to said cylinder including a valve having a part which is fixed with respect to the seat and a part which is movable with respect to said seat, passages and ports operatively connected between said parts of said valve, and the part of said valve which is movable with respect to said seat having means to maintain said part which is movable with respect to said seat in a fixed position.

8. The combination of claim 7 wherein said means maintaining said part of said valve in a fixed position include a leveling weight attached to the last mentioned part, and damping means operatively connected with said weight.

9. The combination of claim 8 wherein said damping means includes a casing in which said valve and weight are disposed, a pressure line connected with said casing to apply liquid under pressure to the casing and valve for subsequent distribution to said cylinder.

10. A self-leveling seat assembly mounted on a vehicular structure comprising, seat means, means pivotally connecting the seat means to the structure for pivotal displacement along an axis parallel to the direction of movement of the structure, position control means operatively connected to the seat means and structure for controlling the pivotal position of the seat means about said axis and level control means operatively connected to the position control means and responsive to pivotal displacement of the structure with respect to said axis to the exclusion of inertia and accelerating forces, for controlling the position control means to maintain the seat means level, said level control means comprising valve means connected to the seat means including gravity-operated, mechanically unrestrained valve control means and means carried by the seat means for retarding relative movement between the valve control means and the seat means to substantially eliminate the effects of inertia and accelerating forces transmitted to the valve means from the vehicular structure.

References Cited in the file of this patent
UNITED STATES PATENTS

| | | |
|---|---|---|
| 2,257,773 | Wolf | Oct. 7, 1941 |
| 2,284,352 | Zank | May 26, 1942 |
| 2,422,210 | Reischl | June 17, 1947 |
| 2,489,981 | Rose | Nov. 29, 1949 |
| 2,568,401 | Lynn | Sept. 18, 1951 |
| 2,582,896 | Acton | Jan. 15, 1952 |
| 2,657,009 | Neis | Oct. 27, 1953 |
| 2,715,938 | Miller | Aug. 23, 1955 |